(12) United States Patent
Zinn

(10) Patent No.: US 10,420,059 B2
(45) Date of Patent: Sep. 17, 2019

(54) METHOD AND DEVICE FOR HIGH-PRECISION DETERMINATION OF A MOBILE DEVICE AND METHOD FOR LOCATING OR POSITIONING STATIONARY DEVICES

(71) Applicant: SCHNEIDER ELECTRIC INDUSTRIES SAS, Rueil-Malmaison (FR)

(72) Inventor: Marcus Zinn, Rodgau (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/780,337

(22) PCT Filed: Dec. 8, 2016

(86) PCT No.: PCT/EP2016/080262
§ 371 (c)(1),
(2) Date: May 31, 2018

(87) PCT Pub. No.: WO2017/097905
PCT Pub. Date: Jun. 15, 2017

(65) Prior Publication Data
US 2019/0075539 A1    Mar. 7, 2019

(30) Foreign Application Priority Data

Dec. 8, 2015 (DE) .................. 10 2015 121 384

(51) Int. Cl.
*H04W 64/00* (2009.01)
*G01C 25/00* (2006.01)
(Continued)

(52) U.S. Cl.
CPC ........ *H04W 64/003* (2013.01); *G01C 25/005* (2013.01); *G01S 5/009* (2013.01);
(Continued)

(58) Field of Classification Search
CPC ....... H04W 64/003; H04W 4/80; G01S 5/009; G01S 5/0054; G01C 25/005
See application file for complete search history.

(56) References Cited

U.S. PATENT DOCUMENTS 10,123,297 B1 * 11/2018 Harney ................. H04W 64/00
2012/0293330 A1   11/2012 Grant et al.
(Continued)

FOREIGN PATENT DOCUMENTS

DE    10 2012 224 422 B3    5/2014
EP            2442600 A1    4/2012

OTHER PUBLICATIONS

International Search Report, dated Feb. 27, 2017, corresponding to Application PCT/EP2016/080262.
(Continued)

*Primary Examiner* — Mazda Sabouri
(74) *Attorney, Agent, or Firm* — Ladas & Parry LLP; Malcolm J. MacDonald

(57) ABSTRACT

A method and a device for high-precision position determination of a mobile device by means of wireless communication, wherein wireless communication is established between at least one first antenna of a calibration device and a second antenna of a mobile device when the antennae are in proximity to one another, to transmit position data to the mobile device. A housing section of the mobile device is fixed in a reference position relative to the calibration device using a position-fixing element, and in that the position data for the reference position, as the current position of the housing section of the mobile device, are transmitted via the
(Continued)

Figure 3:
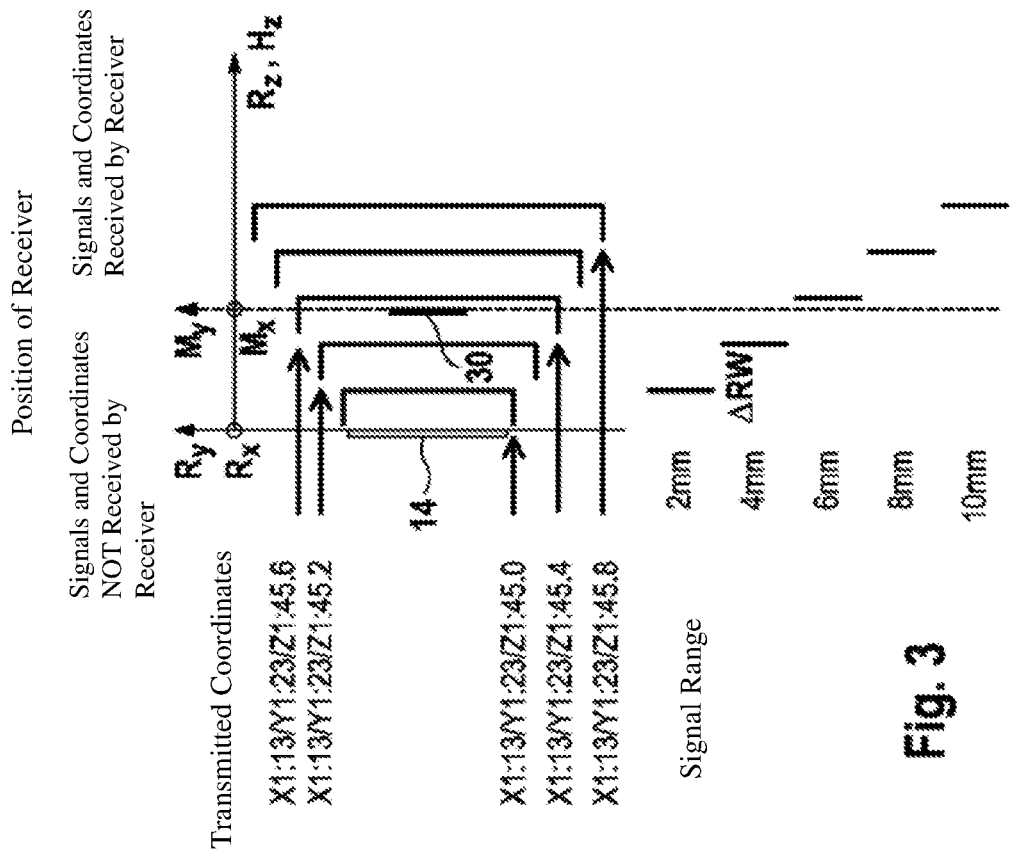

wireless communication between the at least one first antenna, and the second antenna, and in that an inertial navigation unit is calibrated with respect to the current position.

17 Claims, 6 Drawing Sheets

(51) Int. Cl.
  *G01S 5/00* (2006.01)
  *G01S 5/02* (2010.01)
  *H04W 4/80* (2018.01)
(52) U.S. Cl.
  CPC .............. *G01S 5/0054* (2013.01); *G01S 5/02* (2013.01); *G01S 5/0263* (2013.01); *H04W 4/80* (2018.02)

(56) References Cited

U.S. PATENT DOCUMENTS

| | | | |
|---|---|---|---|
| 2013/0029685 A1* | 1/2013 | Moshfeghi | G01S 19/48 455/456.1 |
| 2017/0219700 A1* | 8/2017 | Hewett | G01S 5/0215 |
| 2017/0280288 A1* | 9/2017 | Do | G01S 19/13 |
| 2017/0353909 A1* | 12/2017 | Kawanishi | H04W 4/021 |

OTHER PUBLICATIONS

Ozdenizci, Busra, et aL., "NFC Internal: An Indoor Navigation System", Sensors, 2015, vol. 15, No. 4, pp. 7571-7595.

Steeb, Benjamin, "Location and Location-Based Application in the Museum Context", 2013, http://elib.uni-stuttgart.de/handle/11682/3252.

* cited by examiner

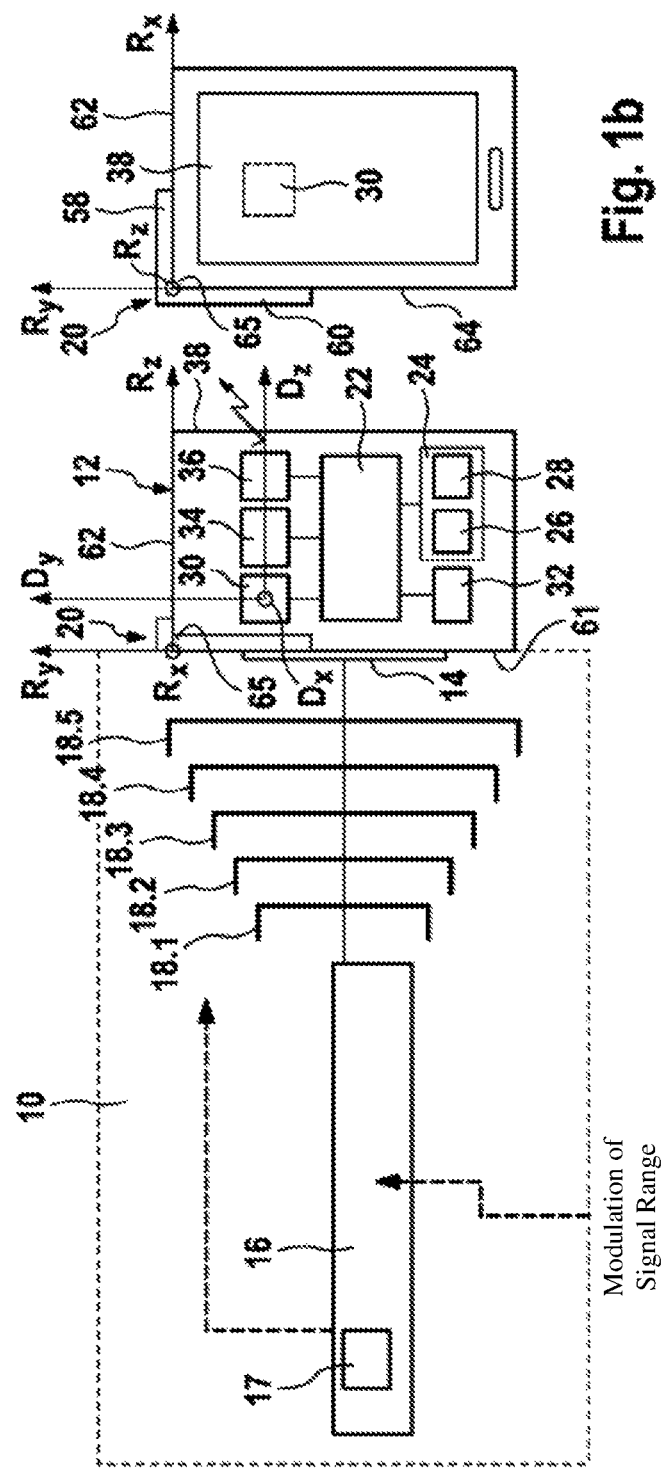

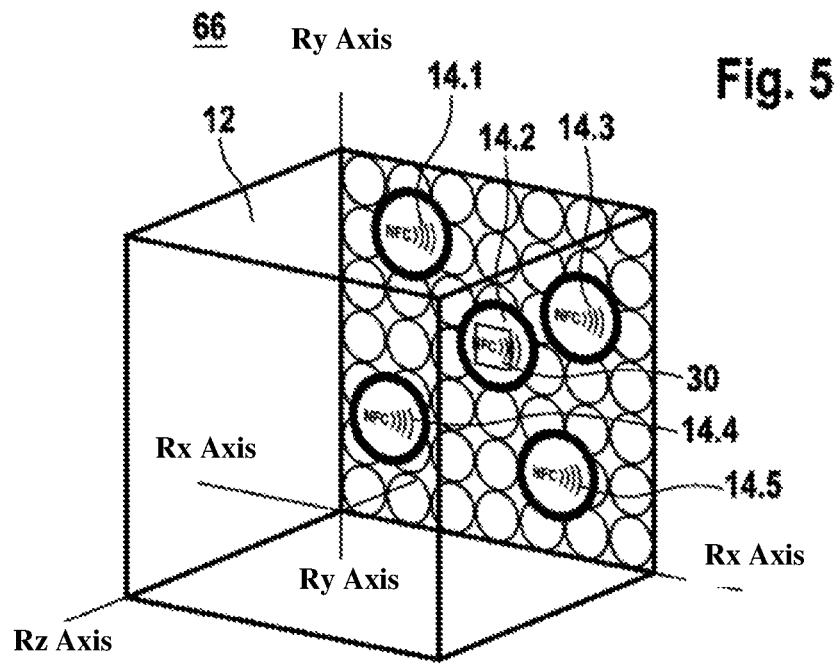
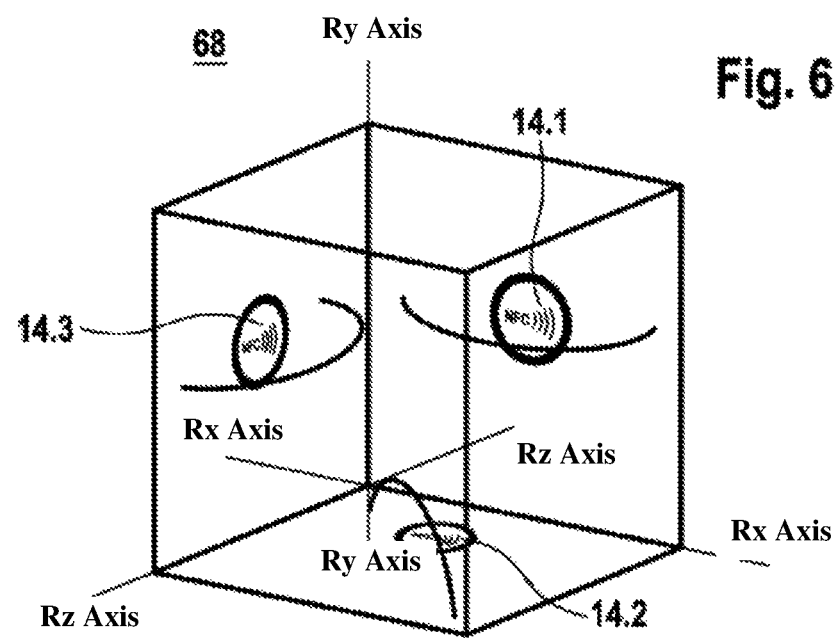

METHOD AND DEVICE FOR HIGH-PRECISION DETERMINATION OF A MOBILE DEVICE AND METHOD FOR LOCATING OR POSITIONING STATIONARY DEVICES

The invention relates to a method for the high-precision position determination of a mobile device, preferably in the interior of a building, according to the preamble of claim 1 or 2, and to a device for carrying out the method according to the preamble of claim 9 or 10.

The invention further relates to a method for locating and/or positioning stationary devices in the interior of a building.

A method and a device of the aforementioned type are described in U.S. 2015/0119086 A1. The device comprises at least one mobile device that is movable within an environment. The mobile device comprises an inertial measurement unit and at least one radio frequency receiver. The mobile device acquires inertial measurements by means of the inertial measurement unit and detects values of signal strengths by means of the at least one radio frequency receiver. The device further comprises a positioning module that enables the simultaneous positioning and mapping of the at least one mobile device within the environment based on the inertial measurements.

For the periodic resetting of the position of the mobile device, orientation points such as GPS readings, NFC (Near Field Communication) tags or two-dimensional bar codes are provided, which contain absolute position data for such points and can be read out by sensors such as a camera, a GPS, an NFC chip or Bluetooth. With the exception of the optical recognition of bar codes, in the known method the mobile device is not removed from the user's pocket for resetting.

The current position of the mobile device is determined via radio frequency receivers, with the accuracy of position determination being in increments that lie in the decimeter range. The radio frequency receivers must be operated online during position determination, and therefore, their energy consumption is high.

US 2013/0332273 A1 relates to a system for determining the positions of a mobile device, comprising a radio network with radio network nodes for communicating with the mobile device for the purpose of measuring signal strengths from the mobile device. The radio network also comprises near field communication nodes for communicating with the mobile device, with the near field communication nodes providing the mobile devices with configuration information, at least upon request, to enable the mobile device to connect with the radio network nodes. The system also comprises a positioning server for receiving signal strength information from the radio network, for determining the position of the mobile device, and for supplying the mobile device with a graphic representation of its position within a floor plan.

In the known systems, the current position of the mobile device is determined via a radio network, and as a result, the positioning accuracy of these systems is limited, and their power consumption is high. Furthermore, such position determination is prone to failure since a link between radio frequency receiver and transmitter is always required.

EP 2442600 B1 relates to a near field communication (NFC) system with an NFC tag, the geographic position of which is transmitted by NFC communication to a mobile wireless device. The geographic position is used within the mobile wireless device to perform authentication. The authentication is a prerequisite for further communication with the NFC tag.

US 2012/0293330 A1 relates to a system and a method for protecting an item of retail merchandise on display. The item of merchandise includes a housing, at least one sensor located in the housing and at least one output device located in the housing. The security system further includes a controller, located in the housing and coupled to the sensor and to the output device. The controller is designed to determine a distance traveled by the item of merchandise from a retail display "home" position, based upon a sensor signal from the sensor. Further, the output device is activated based upon the distance traveled by the item of merchandise when this distance exceeds a threshold distance. The controller can utilize the at least one sensor in conjunction with an inertial navigation system and motion processing algorithms to determine the distance traveled by the item of merchandise from the retail display "home" position.

The article by Busra Ozdenizci, et al. entitled "NFC Internal: An Indoor Navigation System", Sensors, 2015, Vol. 15, No. 4, pp. 7571-7595, relates to an indoor navigation system based on near field communication (NFC). Users are navigated through a building or building complex by the users touching NFC tags that are distributed throughout the building. This enables the user's local position to be updated, so that the user can be guided to the desired destination.

The dissertation by Benjamin Steeb entitled "Location and Location-Based Application in the Museum Context", 2013, http://elib.uni-stuttgart.de/handle/11682/3252, discloses a museum guide for Android devices that displays information about exhibits. Using multiple WLAN access points throughout the museum, the museum guide determines which exhibits are in proximity to the visitor, thereby simplifying the search for these. In addition, attached to each museum piece is a Gadgeteer-based station that visitors can interact with to obtain information about the exhibit. Three different stations are in development: two are operated with the hand in combination with an RFID wristband, and one communicates directly with the museum guide via NFC. The museum contents are stored on a server and can be managed by curators via a web front-end system.

Based on the above, the object of the present invention is to further develop a method and a device for high-precision position determination of a mobile device such that the accuracy of position determination is improved while at the same time energy consumption and susceptibility to failure are reduced.

The object is achieved according to the invention by a method having the features of claim 1 or 2 and by a device having the features of claim 8 or 9.

The method of the invention, according to a first procedure, is distinguished from the prior art in that at least one housing section of the mobile device is fixed in a reference position with respect to the calibration device by means of a position-fixing means, and in that the position data for the reference position as the current position of the housing section of the mobile device are transmitted to the mobile device via the wireless communication between the at least one first antenna and the second antenna, and in that an inertial navigation unit of the mobile device is calibrated with respect to the current position.

An alternative inventive procedure is distinguished from the prior art in that the mobile device is positioned in a reproducibly defined position in relation to the position of the first NFC antenna, and in that, via the NFC communication between the at least one first NFC antenna and the second NFC antenna, the current position of the second NFC antenna is determined and is stored in a memory of the mobile device, and in that an inertial navigation unit is calibrated with respect to the current position.

According to a preferred embodiment, it is provided that the at least one first NFC antenna emits NFC signals of varying signal strengths, wherein with each NFC signal at least one position data value is transmitted that corresponds to the range of the NFC signal in question, and/or wherein the NFC signals received by the second NFC antenna are evaluated in a control unit of the mobile device, wherein the position data values of the NFC signal having the lowest received signal strength are stored as position data values for the second NFC antenna.

With the method features described thus far, a highly accurate, trouble-free and energy-efficient position determination can be achieved.

Preferably, NFC signals emitted by the at least one first NFC antenna have a range of 0 mm≤RW≤150 mm, with the signal strength of successive NFC signals being controlled such that the change in range (ΔRW) of successive signals is 0.50 mm≤ΔRW≤10 mm, and preferably ΔRW=2 mm.

The position data emitted by means of the NFC signal preferably include geographic position values for the first NFC antenna, along with at least one offset-position value ΔX, ΔY, ΔZ that corresponds to the respective change in range of the emitted NFC signals. It is herewith provided that offset-position data for the coordinate direction in which the NFC signals are emitted are preferably changed.

Preferably, the at least one first NFC antenna first emits an NFC signal with a fixed position of the first NFC antenna, after which it emits only NFC signals with at least one offset-position data value that corresponds to the change in range of the NFC signals in question in the propagation direction.

To further improve position determining accuracy, the first NFC antennas are arranged in the form of an NFC antenna array, with the mobile device, in a defined position, using the second NFC antenna to emit a signal in the direction of the NFC antennas of the antenna array, which are switched to receiver mode; the NFC antenna that receives the signal having the highest signal strength then emits NFC signals having various ranges, emitting with each NFC signal at least one position data value that corresponds to the range of the NFC signal in question, and the position data of the NFC signal having the lowest received signal strength are stored as ΔX, ΔY, ΔZ position data for the second NFC antenna.

The invention further relates to a calibration device for the high-precision position determination of a mobile device, preferably in the interior of a building, by means of wireless communication, preferably near field communication (NFC), the calibration device having a memory which is configured to store position data that correspond to a reference position of the calibration device, wherein the calibration device has at least one first NFC antenna, coupled to the memory and configured to initiate a transaction based on wireless communication, preferably NFC communication, and the mobile device has a second NFC antenna and a controller coupled thereto; wireless communication between the first NFC antenna and the second NFC antenna is initiated when the second NFC antenna is located in close proximity to the first NFC antenna, and the position data are transmitted from the first NFC antenna to the second NFC antenna.

According to a first aspect of the invention, the calibration device is assigned a position-fixing means, which is designed to fix a housing section of the mobile device in the reference position during the wireless communication, and the calibration device is designed to transmit the reference position as the current position to the mobile device, and the control unit is designed to calibrate an inertial navigation unit of the mobile device with respect to the current position.

Alternatively, the invention relates to a calibration device for high-precision position determination of a mobile device by means of near field communication (NFC), in which the calibration device comprises at least one first NFC antenna and a memory, the memory being configured to store position data that correspond to the position of the NFC sensor, and the mobile device comprises a second NFC sensor and a control unit coupled thereto, with NFC communication between the first NFC sensor and the second NFC sensor being initiated when the second NFC sensor (30, 46) is located in proximity to the first NFC sensor, and position data being transmitted from the first NFC sensor to the second NFC sensor.

According to one concept of the invention, it is provided that the calibration device is assigned a position-fixing means, which is designed to position a housing section of the mobile device in a reproducibly defined position in relation to the position of the at least one first NFC antenna during NFC communication, and that the at least one first NFC sensor is coupled to a control unit that is designed to control the NFC communication between the at least one first NFC antenna and the NFC antenna for determining current position data for the second NFC antenna, and that a control unit of the mobile device is designed to calibrate an inertial navigation unit with respect to the acquired current position data.

According to a preferred embodiment, it is provided that the control unit coupled to the first NFC antenna is designed to emit NFC signals of various signal strengths, wherein with each NFC signal, at least one position data value that corresponds to the range of the NFC signal is transmitted, and that the control unit of the mobile device is designed to evaluate the received NFC signals such that the position data of the NFC signal having the lowest received signal strength are stored as position data for the second NFC antenna.

According to a further preferred embodiment, the fixing means spans a reference coordinate system, in which a single NFC antenna is located within an RX-RY plane, and/or in which an array of NFC antennas is located within the RX-RY plane, and/or in which one or more NFC antennas that emit the NFC signals from different directions to the second NFC antenna are each located in an RX-RY plane, an RX-RZ plane or an RY-RZ plane.

It is further provided that the fixing means includes mechanical stops in the RX, RY, and/or RZ direction, or a receptacle for at least one housing section of the mobile device, and/or that the fixing means is an angle disposed in an RY-RY plane and/or a non-slip mat with marking.

The mobile device is preferably a smartphone, tablet or pen, with the second NFC antenna preferably integrated into the tip of the pen and coupled to a control unit likewise integrated into the pen, and the control unit is designed to store the position data received by the second NFC antenna as its own position data and to calibrate an inertial navigation unit with respect to the received position data.

Figure 2:
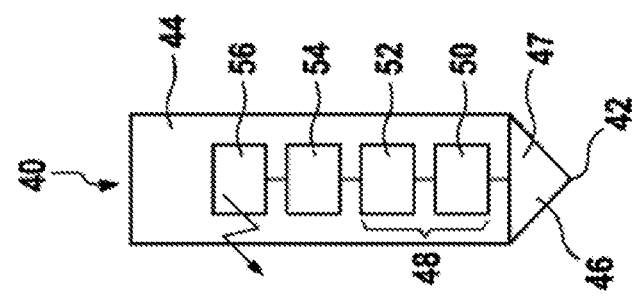
Figure 4:
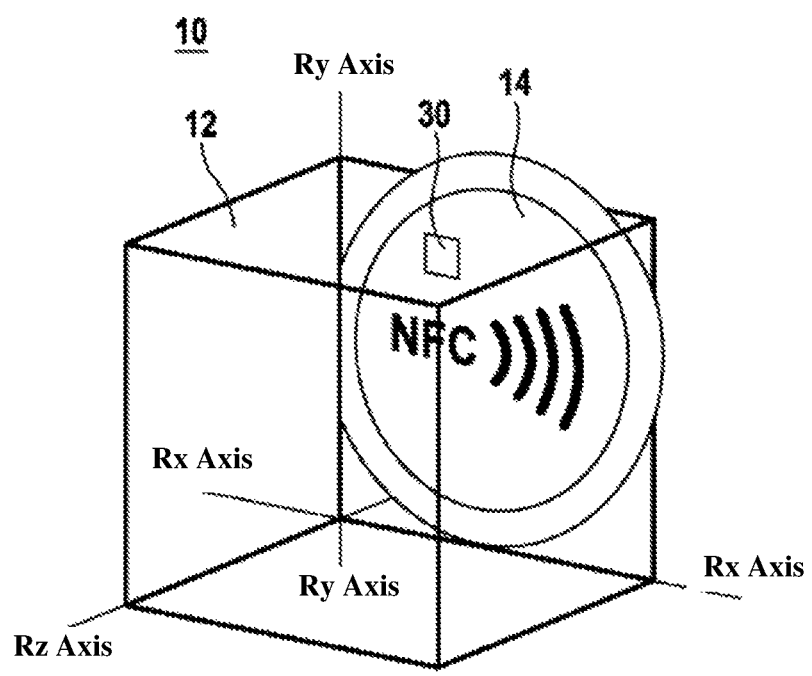
Figure 7:
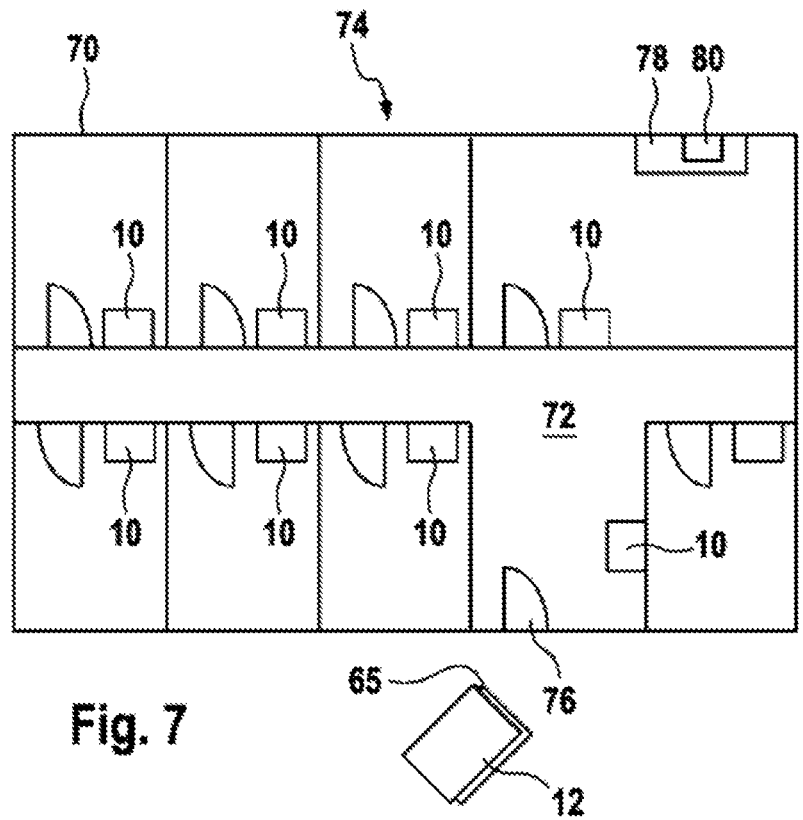
Figure 8:
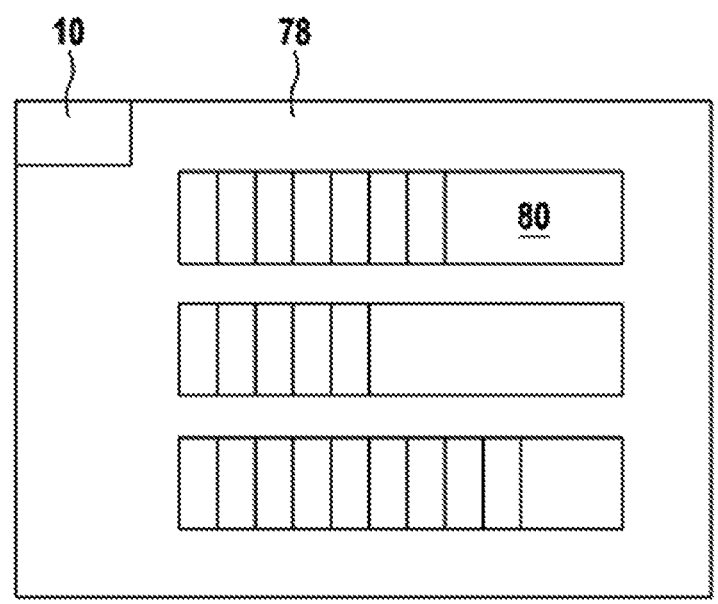
Figure 9:
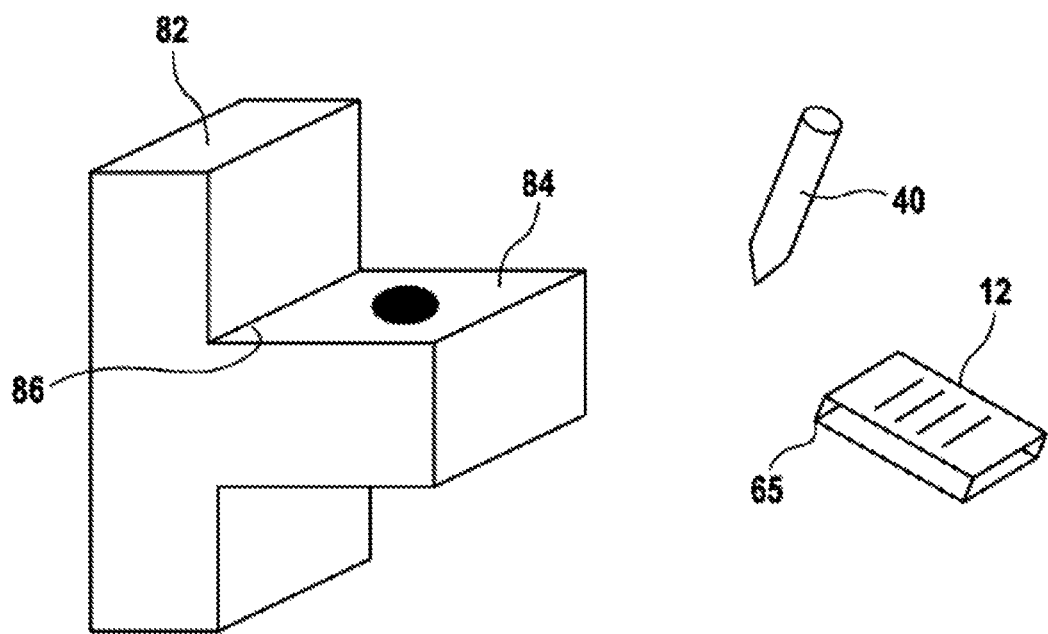

Additional details, advantages and features of the invention will be apparent not only from the claims and from the features specified therein, alone and/or in combination, but also from the following description of the preferred exemplary embodiment depicted in the drawings. Shown are:

FIG. 1a), b) a diagram of a calibration device for high-precision position determination of a mobile device, in views from the front and from the side, FIG. 2 a diagram of an alternative embodiment of a mobile device, FIG. 3 a diagram of an NFC communication process, FIG. 4 a diagram of a first embodiment of the calibration device, FIG. 5 a diagram of a second embodiment of the calibration device, FIG. 6 a diagram of a third embodiment of the calibration device, FIG. 7 a diagram of the interior of a building with calibration devices in rooms, control cabinets and/or equipment, FIG. 8 a diagram of a control cabinet with a calibration device, and FIG. 9 a diagram of an automation unit with a calibration device.

FIGS. 1a) and 1b) schematically illustrate a calibration device 10 for the high-precision position determination of a mobile device 12 by means of near field communication (NFC), from a front view and a side view.

Calibration device 10 comprises at least one NFC antenna 14 coupled to a control unit 16, such as a transceiver, which is assigned to a memory 17. Control unit 16 is configured to initiate a transaction on the basis of NFC signals (18.1 . . . 18.k). Memory 17 is configured to store position data in the form of geoposition data or user-defined coordinates that correspond to a position of the NFC antenna 14 or to a reference position of a position-fixing means 20 assigned to the calibration device 10.

Mobile device 12 comprises at least one processor 22, an inertial navigation unit 24 having at least one acceleration sensor 26 and at least one magnetic field sensor 28, at least one NFC antenna 30 and a memory 32. Navigation unit 24, NFC antenna 30 and memory 32 are connected to a processor 22.

Mobile device 12, e.g. a smartphone, may also include a navigation module 34 along with a high-frequency transceiver 36 for communication based on the WiFi, 4G-LTE, or Bluetooth standard.

Mobile device 12 further comprises a display unit 38, on which, for example, a floor plan of the interior of a building, the current position of mobile device 12 and a navigation path to a destination point can be displayed.

FIG. 2 shows an alternative embodiment of a mobile device 40 in the form of a pen, with a housing tip 42 and an attached housing 44. Located in the tip 42 of housing 44 is an NFC antenna 46 with control unit 47 as transceiver, for initiating NFC communication with NFC antenna 14 of calibration device 10 when pen 40 is in proximity to NFC antenna 14, in particular when it is at the coordinate system origin of position-fixing means 20.

Mobile device 40 further comprises an inertial navigation unit 48 having at least one acceleration sensor 50 and at least one magnetic sensor 52. Transceiver 47 and inertial navigation unit 48 are connected to a processor 54. Further provided is a transmitting/receiving unit 54, which communicates via a radio standard such as WiFi or Bluetooth with an external device such as a smartphone, laptop or tablet or with a radio network to display the current position or orientation of mobile device 40 in an environment such as the interior of a building on a display unit.

The invention is based upon the concept of determining the position of mobile device 12, 40 to millimeter accuracy on the basis of near field communication, and then transmitting the determined position to mobile device 12, 40, with the processor 22, 54 of mobile device 12, 40 being designed to calibrate the inertial navigation unit 24, 48 with respect to the current position of mobile device 12, 40.

Based on the high-precision millimeter-accurate position determination of mobile device 12, 40, said device can be used for in-house navigation and for the localization and/or positioning of stationary objects.

In a first preferred embodiment of the invention, mobile device 12, 40 is positioned in position-fixing means 20 of calibration device 10. Position-fixing means 20 may be embodied as an angular element, for example, with a first leg 58 extending along an RX axis and one leg 60 extending along an RY axis of a Cartesian reference coordinate system RX-RY-RZ. In the illustrated exemplary embodiment, the RY-RZ plane forms the plane of the drawing, with the RX axis pointing perpendicular to the plane of the drawing. Mobile device 12 is fixed in position-fixing means 20 in such a way that a rear wall 61 abuts the RX-RY plane, while an upper edge 62 runs along the RX axis against leg 58 and a side edge 64 runs along the RY axis against leg 60. One corner 65 of mobile device 12 therefore lies at the coordinate system origin RX0, RY0, RZ0.

As soon as mobile device 12 is positioned in position-fixing means 20, NFC communication is activated between NFC antenna 14 and NFC antenna 30, and position data are transmitted from NFC antenna 14 to NFC antenna 30.

To determine the millimeter-accurate position of NFC antenna 30 within mobile device 12, it is provided that NFC antenna 14 emits signals 18.1 . . . 18.k having varying signal strengths and thus varying ranges in succession. The signal strength is adjusted by control unit 16. With each signal 18.1 . . . 18.k, different position coordinates are emitted, with at least one RZ coordinate being proportional to the range of the signal or corresponding to the range of the signal.

FIG. 3 shows the signals 18.1 . . . 18.k and their respective ranges with respect to the RZ axis of the reference coordinate system RX-RY-RZ. Here, it is assumed that NFC antenna 14 lies flat in the RX-RY plane, as shown in FIG. 1.

For each axis, which has its own chipset, an axis value can be set. If only one chipset exists, e.g. on the Z axis, the X-Y values are emitted not with an offset, but with a constant value.

With each signal, constant RX1-RZ1 coordinates are transmitted as RX-RY coordinates of NFC antenna 14, along with variable RZ1 coordinates that correspond to the range of the signal in question with respect to the RX-RY-RZ coordinate system. In the illustrated exemplary embodiment, the signal strength is controlled such that signals having a signal range difference ΔRW of 2 mm are emitted. After mobile device 12 has been fixed in position-fixing means 20, NFC antenna 30 can receive only those signals whose range corresponds at least to the distance between NFC antenna 14 and NFC antenna 30 (in the example shown, signals 18.3 . . . 18.5). As a result, signals 18.1 and 18.2, which do not reach NFC antenna 30 due to their short range, are not used in determining the position of NFC antenna 30. The signals 18.3, 18.4, 18.5 received by NFC antenna 30 are analyzed in processor 22, and the signal having the lowest signal strength is selected from the received signals. The RZ coordinate of this signal corresponds to the DZ coordinate of NFC antenna 30.

Therefore, the received coordinates correspond to an RX and RY position of the NFC antenna along with the transmitted RZ coordinate of NFC antenna 14, with an offset value that corresponds to the distance between NFC antenna 14 as transmitter and NFC antenna 30 as receiver. The current position of NFC antenna 30 and consequently also of mobile device 12 is thereby determined. The coordinates thus determined are stored in mobile device 12.

The at least one acceleration sensor 26 and the at least one magnetic field sensor 28 are then calibrated with respect to the received current position of mobile device 12.

It is also possible for the coordinates RX0, RY0, RZ0 of the coordinate system origin of the reference coordinate system to be stored as a reference position in memory 17 of control unit 16. These coordinates can be transmitted via NFC antenna 14 to mobile device 12, positioned in position-fixing means 20. Due to the defined position in the reference coordinate system, the origin coordinates can be used as the reference position for calibrating the inertial navigation unit 24, with calibration being performed at a housing tip 65 of mobile device 12, lying at the coordinate system origin RX0, RY0, RZ0 of the reference coordinate system.

The basic concept of the present invention, i.e. transmitting the current position coordinates of mobile device 12 that correspond to its exact position to said mobile device, could also be implemented in this way.

FIG. 4 shows an embodiment of calibration device 10 in which NFC antenna 14 is designed as a surface antenna having a surface extension that is substantially larger than the surface area of NFC antenna 30, 46 of mobile device 12, 40. This ensures that in the near range, the signals 18.1 ... 18.k emanating from NFC antenna 14 are largely in the shape of a wave running parallel to the RX-RY plane, and therefore, inaccuracies resulting from the spherical propagation of the signals 18.1 ... 18.k can be disregarded.

FIG. 5 shows a second embodiment of a calibration device 66. In this embodiment, it is provided that a matrix-shaped array of NFC antennas 14.1 ... 14.n is arranged in the RX-RY plane, with each individual NFC antenna 14.1 ... 14.n being assigned a corresponding RX-RY coordinate of the reference coordinate system. NFC communication between NFC antennas 14.1 ... 14.n and NFC antenna 30 of the mobile device is carried out according to the same principle as described in FIG. 1 and FIG. 3. However, the arrangement of NFC antennas 14.1 ... 14.n in the form of an array enables greater accuracy in determining the RZ and the RX and RY coordinates of NFC antenna 30 to be achieved.

In the embodiment of calibration device 66 shown in FIG. 5, it is also possible, once mobile device 12, 40 has been fixed in position-fixing means 20, for NFC antenna 30 to initially be switched to NFC transmitter mode and NFC antennas 14.1 ... 14.n to NFC receiver mode. Thereafter, the NFC antenna 14.1 ... 14.n that receives the strongest signal and is thus the shortest distance from NFC antenna 30 is selected, in the present case NFC antenna 14.2. NFC antenna 14.2 can then be switched to transmitter mode, in accordance with the NFC communication depicted in FIG. 3, to determine the distance, i.e. the RZ coordinate, of NFC antenna 30.

With this method, the millimeter-accurate position of NFC antenna 30 within mobile device 12 can be transmitted to mobile device 12.

FIG. 6 shows a third embodiment of a calibration device 68, in which one or more NFC antennas 14.1 ... 14.N are each arranged in an RX-RY plane, an RX-RZ plane or an RY-RZ plane. In this embodiment, signals can be transmitted from different directions to NFC antenna 30, to enable an exact position determination, e.g. by the triangulation method.

FIG. 7 shows a floor plan 70 of the interior 72 of a building 74, in which calibration devices 10 are arranged distributed within the building interior for the high-precision, millimeter-accurate position determination of mobile device 12.

Upon entering the interior 72, a user first launches a mobile interior navigation application on mobile device 12. To calibrate the mobile application, the user positions mobile device 12 in position-fixing means 20 of calibration device 10, e.g. near the entrance 76, starting up the NFC communication to determine and transmit the current position (reference position) to mobile device 12. The application is then calibrated in terms of position, i.e. it "recognizes" the starting position of mobile device 12.

Once the exact position of mobile device 12 has been transmitted to said mobile device by calibration device 10, mobile device 12 can navigate within the interior 70 of building 72 without external devices. Navigation is carried out solely on the basis of inertial navigation unit 24 combined with positioning module 32, by which the floor plan 74 of interior 70 together with the actual position of mobile device 12 are displayed on display 38 of mobile device 12.

Target objects 78, 80 such as rooms, control cabinets, components in control cabinets, equipment or other objects in interior 70, the coordinates of which are available in the mobile navigation application locally or in an external database outside of the mobile device, can then be located.

The exact position of the objects 78, 80 can be transmitted to memory 32 via the near field communication between calibration device 10 and mobile device 12. It is also possible for the coordinates of the objects 78, 80 to already be stored in memory 32 or loaded into mobile device 12 from a radio network via transmitting/receiving unit 36.

The 3-D coordinates of NFC antenna 14 or the reference positions are preferably stored in calibration device 10; the coordinates may be GPS-compatible geocoordinates or user-specific coordinates corresponding to the RX, RY, RZ reference coordinate system. In the present exemplary embodiment, the user-specific reference coordinate system RX=0, RY=0 and RZ=0 is used.

FIG. 8 shows a control cabinet as target object 78, for example, with calibration device 10 and a plurality of components 80 such as switches, I/O units, controls, etc. To locate the specified component 80, mobile device 12 can be calibrated or re-calibrated at calibration device 10, connected to control cabinet 78, for the purpose of increasing precision. Component 80, the exact coordinates of which are stored in memory 32, can then be located with millimeter-accuracy by means of inertial navigation unit 24.

FIG. 9 shows the possibility of positioning a device 82 at a predetermined position, e.g. in the interior 70 of building 72 or in control cabinet 78. For this purpose, device 82 includes an NFC antenna 84 with a control unit and also includes a position-fixing device 86. Mobile device 12, which knows the exact target position of device 82, is fixed in position-fixing device 86 and is moved with device 86 until the actual position displayed on the display of mobile device 12 corresponds to the target position.

The NFC antenna 84 then enables the current position to be transmitted from mobile device 12 to a memory of device 82. The position data can be stored in a database, so that it is possible to subsequently locate the device 82.

Since device 82 knows its current position, the device can in turn be used as a calibration device. This means that when devices with NFC technology are used in an industrial plant, any of these devices may be used as a calibration device. For such cases it is provided that an NFC stream specified by the device comprises the original NFC stream of the device and an extension, which correspond to the coordinates of the device.

The calibration device according to the invention is distinguished from the prior art by a particularly high accuracy, lying in the millimeter range. The use of a calibration device 10 makes it possible to communicate the exact position to mobile device 12 at all times.

In the real world, the position of the mobile device is always the same during the synchronization period. The coordinate that is set by the calibration device in the mobile device, e.g. the coordinate of the upper left corner of the mobile device, is used. The Z coordinate results from the distance between transmitting and receiving antennas. Two or more NFC chips are suitable for receiving. The mobile device emits a signal and the calibration device can include multiple receivers that can calculate the positions of the transmitter via triangulation.

Since navigation in the interior space is based solely on inertial navigation unit 24, the method in mobile device 12 consumes far less energy than prior art solutions, because the wireless systems used in such solutions such as WiFi, Bluetooth and 4G-LTE are always active and therefore have a high energy consumption, which is usually disadvantageous for mobile devices.

The invention claimed is:

1. A method for high-precision position determination of a mobile device by means of wireless communication, including near field communication (NFC), wherein wireless communication is established between at least one first antenna of a calibration device and one second antenna of a mobile device when said antennas are in proximity to one another, in order to transmit position data to the mobile device,
   wherein at least one housing section of the mobile device is fixed in a reference position (RX0, RY0, RZ0) relative to the calibration device by means of a position-fixing means,
   wherein the position data for the reference position, as the current position of the housing section of the mobile device, are transmitted via the wireless communication between the at least one first antenna and the second antenna,
   wherein an inertial navigation unit of the mobile device is calibrated with respect to the current position,
   wherein the first NFC antennas are arranged in the form of an NFC antenna array, wherein the mobile device, in a defined position, emits a signal by means of the second NFC antenna in the direction of the NFC antennas of the antenna array, which are switched to receiver mode, wherein the NFC antenna that receives a signal having the highest signal strength then emits NFC signals of different ranges, wherein with each NFC signal, at least one position data value that corresponds to the range of the NFC signal in question is transmitted, and wherein the position data of the NFC signal having the lowest received signal strength are stored as RX, RY, RZ position data for the second NFC antenna.

2. A method for high-precision position determination of a mobile device by means of near field communication (NFC), wherein the NFC is established between a first NFC antenna of a calibration device and a second NFC antenna of the mobile device when said devices are in proximity to one another, for the purpose of transmitting position data to the mobile device, wherein the mobile device is positioned in a reproducibly defined position in relation to the position of the first NFC antenna, and wherein via the NFC communication between the at least one first NFC antenna and the second NFC antenna, the current position of the second NFC antenna is determined and is stored in a memory of the mobile device, and wherein an inertial navigation unit is calibrated with respect to the current position,
   wherein the first NFC antennas are arranged in the form of an NFC antenna array, wherein the mobile device, in a defined position, emits a signal by means of the second NFC antenna in the direction of the NFC antennas of the antenna array, which are switched to receiver mode, wherein the NFC antenna that receives a signal having the highest signal strength then emits NFC signals of different ranges, wherein with each NFC signal, at least one position data value that corresponds to the range of the NFC signal in question is transmitted, and wherein the position data of the NFC signal having the lowest received signal strength are stored as RX, RY, RZ position data for the second NFC antenna.

3. The method according to claim 2, wherein the NFC signals emitted by the at least one first NFC antenna have a range of $0\ mm \leq RW \leq 150\ mm$, wherein the signal strength of successive NFC signals is controlled such that a change in the range ($\Delta RW$) of successive signals is within the range of $0.50\ mm \leq \Delta RW \leq 10\ mm$.

4. The method according to claim 2, wherein the position data transmitted via the NFC signal comprise the geographic position of the first NFC antenna and at least one offset-position data value $\Delta X$, $\Delta Y$, $\Delta Z$ that corresponds to the respective change in range of the emitted NFC signals.

5. The method according to claim 1, wherein the at least one first NFC antenna first emits an NFC signal with a fixed position of the first NFC antenna, and then emits only NFC signals with at least one offset-position data value that corresponds to the change in range of the respective NFC signals in the propagation direction.

6. A calibration device for high-precision position determination of a mobile device by means of wireless communication, including near field communication (NFC), wherein the calibration device comprises:
   a memory that is configured to store position data corresponding to a reference position of the calibration device, wherein the calibration device includes at least one first NFC antenna, coupled to the memory and configured to initiate a transaction based on wireless communication, including NFC communication, wherein the mobile device includes a second NFC antenna and a control unit coupled thereto, wherein the wireless communication between the first NFC antenna and the second NFC antenna is initiated when the second NFC antenna is in proximity to the first NFC antenna, and wherein the position data are transmitted from the first NFC antenna to the second NFC antenna,
   wherein the calibration device is assigned a position fixing means, which is designed to fix a housing section of the mobile device in the reference position during wireless communication, and wherein the calibration device is designed to transmit the reference position as the current position to the mobile device, and wherein the control unit is designed to calibrate an inertial navigation unit of the mobile device with respect to the current position, wherein the first NFC antennas are arranged in the form of an NFC antenna array, wherein the mobile device, in a defined position, emits a signal by means of the second NFC antenna in the direction of the NFC antennas of the antenna array, which are switched to receiver mode, wherein the NFC antenna that receives a signal having the highest signal strength then emits NFC signals of different ranges, wherein with each NFC signal, at least one position data value that corresponds to the range of the NFC signal in question is transmitted, and wherein the position data of the NFC signal having the lowest received signal strength are stored as RX, RY, RZ position data for the second NFC antenna.

7. A calibration device for high-precision position determination of a mobile device by means of near field communication (NFC), wherein the calibration device comprises:

at least one first NFC antenna and a memory, wherein the memory is configured to store position data that correspond to a position of the NFC sensor, wherein the mobile device includes a second NFC sensor and a control unit coupled thereto, wherein the NFC communication between the first NFC sensor and the second NFC sensor is initiated when the second NFC sensor is in proximity to the first NFC sensor, and wherein the position data are transmitted from the first NFC sensor to the second NFC sensor, wherein the calibration device is assigned a position-fixing means, which is designed to position a housing section of the mobile device in a reproducibly defined position relative to the position of the at least one first NFC antenna during the NFC communication, and wherein the at least one first NFC sensor is coupled to a control unit, which is designed to control the NFC communication between the at least one first NFC antenna and the NFC antenna for the purpose of acquiring current position data for the second NFC antenna, and wherein a control unit of the mobile device is designed to calibrate an inertial navigation unit with respect to the acquired current position data, wherein the first NFC antennas are arranged in the form of an NFC antenna array, wherein the mobile device, in a defined position, emits a signal by means of the second NFC antenna in the direction of the NFC antennas of the antenna array, which are switched to receiver mode, wherein the NFC antenna that receives a signal having the highest signal strength then emits NFC signals of different ranges, wherein with each NFC signal, at least one position data value that corresponds to the range of the NFC signal in question is transmitted, and wherein the position data of the NFC signal having the lowest received signal strength are stored as RX, RY, RZ position data for the second NFC antenna.

8. The calibration device according to claim 5, wherein the control unit coupled to the first NFC antenna is designed to transmit NFC signals of varying signal strengths, wherein with each NFC signal, at least one position data value that corresponds to the range of the NFC signal in question is transmitted, and wherein the control unit of the mobile device is designed to evaluate the received NFC signals such that the position data of the NFC signal having the lowest received signal strength are stored as position data for the second NFC antenna.

9. The calibration device according to claim 4, wherein the position-fixing means spans a reference coordinate system (RX, RY, RZ), wherein a single NFC antenna is located in an RX-RY plane, and/or wherein an array of NFC antennas is arranged in the RX-RY plane, and/or wherein one or more NFC antennas are arranged in the RX-RY plane, in an RX-RZ plane, or in an RY-RZ plane, and transmit NFC signals from different directions to the second NFC antenna.

10. The calibration device according to claim 4, wherein the position-fixing means includes mechanical stops in the RX, the RY, and/or the RZ direction, or a receptacle for at least one housing section of the mobile device, and/or wherein the position-fixing means is an angle disposed on an RX RY plane, and/or wherein the position fixing means is a non-slip mat with marking.

11. The calibration device according to claim 4, wherein the mobile device is a smartphone, tablet, or pen.

12. The calibration device according to claim 8, wherein the second NFC antenna is integrated into a tip of the pen and is coupled to a control unit integrated into the pen, wherein the control unit is designed to store the position data received from the second NFC antenna as position data for said antenna and to calibrate an inertial navigation unit with respect to the received position data.

13. The calibration device according to claim 5, wherein the position-fixing means spans a reference coordinate system (RX, RY, RZ), wherein a single NFC antenna is located in an RX-RY plane, and/or wherein an array of NFC antennas is arranged in the RX-RY plane, and/or wherein one or more NFC antennas are arranged in the RX-RY plane, in an RX-RZ plane, or in an RY-RZ plane, and transmit NFC signals from different directions to the second NFC antenna.

14. The calibration device according to claim 5, wherein the position-fixing means includes mechanical stops in the RX, the RY, and/or the RZ direction, or a receptacle for at least one housing section of the mobile device, and/or wherein the position-fixing means is an angle disposed on an RX RY plane, and/or wherein the position fixing means is a non-slip mat with marking.

15. The calibration device according to claim 5, wherein the mobile device is a smartphone, tablet, or pen.

16. The calibration device according to claim 12, wherein the second NFC antenna is integrated into a tip of the pen and is coupled to a control unit integrated into the pen, and wherein the control unit is designed to store the position data received from the second NFC antenna as position data for said antenna and to calibrate an inertial navigation unit with respect to the received position data.

17. The method according to claim 3, wherein $\Delta RW=2$ mm.

* * * * *